United States Patent [19]

Turner

[11] Patent Number: 4,920,018
[45] Date of Patent: Apr. 24, 1990

[54] BATTERY TERMINAL SEAL

[76] Inventor: William C. Turner, 1020 N. 23rd St., Coeur d'Alene, Id. 83814

[21] Appl. No.: 373,109

[22] Filed: Jun. 28, 1989

[51] Int. Cl.⁵ .............................................. H01M 2/00
[52] U.S. Cl. ..................................... 429/65; 439/202; 439/522
[58] Field of Search .................... 429/65; 439/202, 522

[56] References Cited

U.S. PATENT DOCUMENTS

| | | | |
|---|---|---|---|
| 2,052,081 | 8/1936 | Campbell | 439/202 |
| 2,800,522 | 7/1957 | Coleman et al. | 136/135 |
| 3,633,154 | 1/1972 | Glantz | 439/202 |
| 3,641,480 | 2/1972 | Robin | 439/202 |
| 3,775,730 | 11/1973 | Rowls et al. | 339/116 R |
| 4,698,459 | 10/1987 | Drake | 174/138 F |
| 4,778,408 | 10/1988 | Morrison | 439/522 |

Primary Examiner—Stephen J. Kalafut
Attorney, Agent, or Firm—Wells, St. John & Roberts

[57] ABSTRACT

A cover for battery terminals includes a base plate and cap arrangement that, together with flexible seals, may be placed over a battery terminal and an attached connector to seal and protect the terminal and connector against corrosion. The base plate includes two base sections that are connected by an integral hinge. Each section includes a semi-circular recess that closes about the terminal below the connector when the two sections are moved together to a closed condition. A first flexible seal is positioned over the terminal post prior to placement of the base. The base may then be placed over the terminal and pressed onto the seal. The seal will deform and fill any voids between the terminal and the cover base. The cap may then be placed over the base, enclosing the terminal and connector. Interfitting walls of the cap and base form an enclosure seal about the terminal and connector. Matching cable receiving recesses are provided in the walls of the base and cap. A second seal may be placed in the recesses to complete the airtight seal of the terminal and connector, thereby protecting them against corrosion. The above assembly may be completed with the battery connector attached to the terminal post.

17 Claims, 2 Drawing Sheets

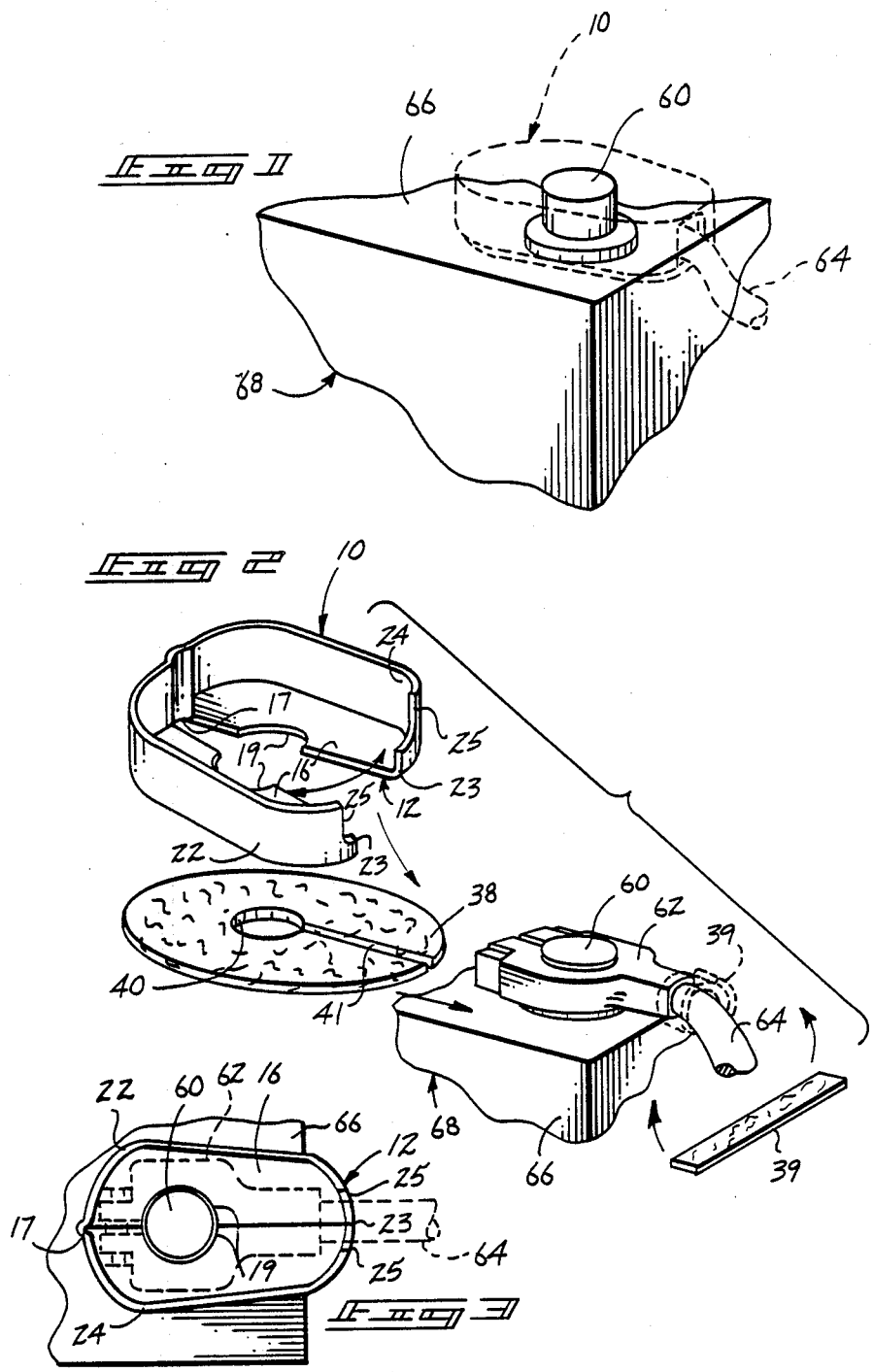

U.S. Patent   Apr. 24, 1990   Sheet 2 of 2   4,920,018
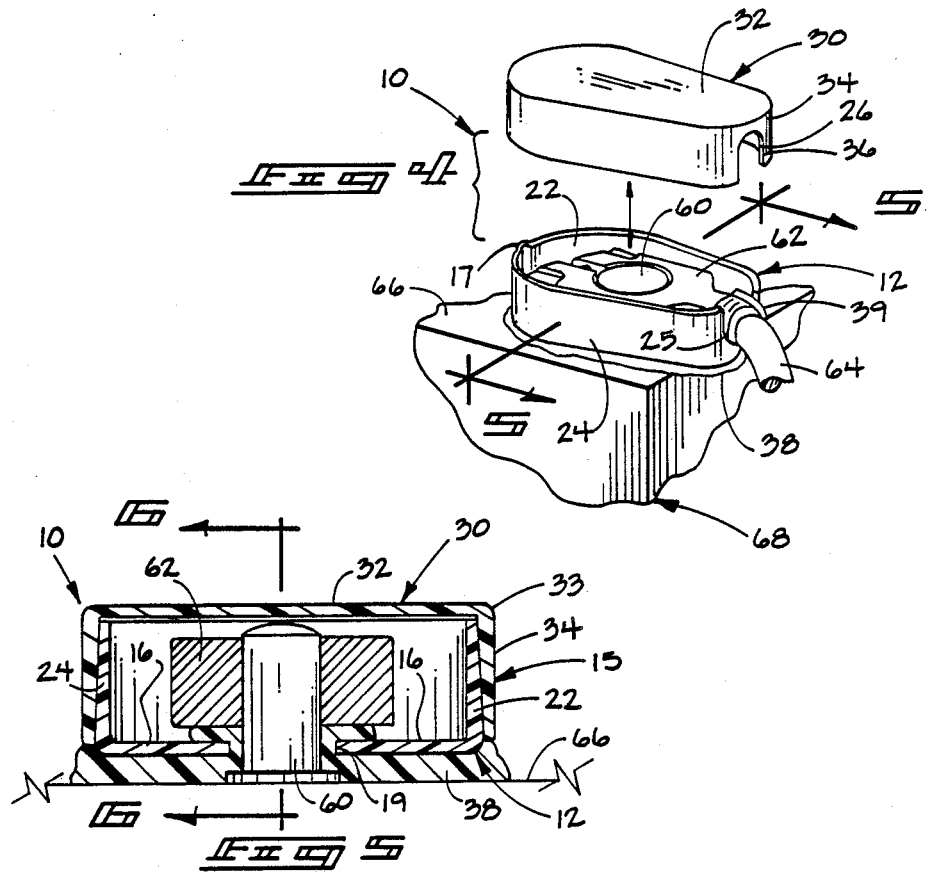
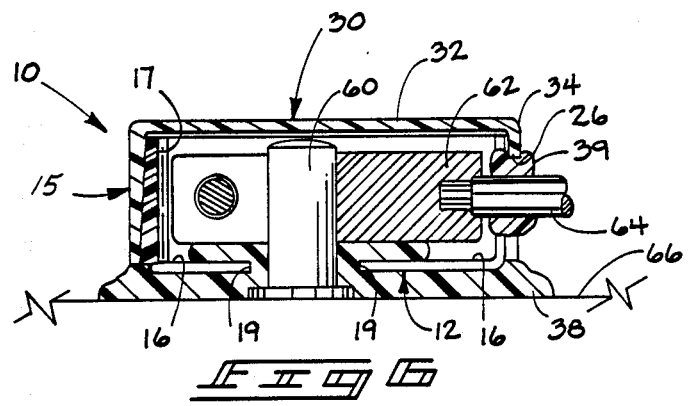

BATTERY TERMINAL SEAL

TECHNICAL FIELD

This invention relates to protecting and sealing battery terminals and battery cable connectors to prevent corrosion.

BACKGROUND OF THE INVENTION

Conventional vehicle battery cases are typically formed of plastic materials and include outwardly projecting metal battery post terminals. Eventually the plastic case material weakens in the area about the terminals and no longer forms a good seal. Gases seep through the loose areas about the terminals, or through vents provided in the battery case and attack the terminals and connectors. As a result, the terminals and connectors become corroded and good electrical contact between connectors and terminals is lost.

A proven way to prevent corrosion is to hermetically isolate the contact areas between the terminals and connectors from the battery case. However, this has been a difficult task, especially as a "retrofit" with installed batteries. Covers which do form a relatively gastight seal are expensive and difficult to install. Some such covers actually form an integral part of the battery terminal connector itself. Examples of present types of covers can be found in U.S. Pat. Nos. 2,800,522, 3,775,730 and 4,698,459.

BRIEF DESCRIPTION OF THE DRAWINGS

The preferred embodiment of the invention is illustrated in the accompanying drawings, in which:

FIG. 1 is a partial perspective view showing a battery with a terminal post, with the present terminal cover in phantom;

FIG. 2 is an exploded view of the battery terminal post, connector and base of the present terminal cover;

FIG. 3 is top plan view of the base of the terminal cover in place over the terminal post and with the terminal connector shown in dashed lines;

FIG. 4 is a perspective view of the base of the terminal cover placed over the terminal post with the cap in position to be placed over the base;

FIG. 5 is an enlarged cross-sectional view of the terminal cover, taken along line 5—5 of FIG. 4 with the cap in place thereon; and FIG. 6 is a cross-sectional view taken along line 6—6 of FIG. 5.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

The present invention arose out of the need for a retrofit gas tight cover for assembled battery post terminals and cable connectors to prevent excessive corrosion and loss of good electrical contact between posts and connectors.

It is desirable that such a cover be inexpensive and easy to install and remove for access to the terminal posts and cable connectors. It is also desirable that such a cover be adaptable to fit batteries with top terminal posts, as well as side terminals and which does not require removal of the terminal connectors for installation.

A preferred terminal cover is illustrated in the accompanying drawings and is referred to generally by the reference numeral 10. In the preferred form, the terminal cover includes two elements, a base plate 12, and a cap 30. A side wall 15 on either or preferably both sections forms an enclosure that is adapted to receive the battery terminal 60 and connector 62. In a preferred embodiment the base plate 12 is comprised of a pair of elongated base sections 16. As shown in FIG. 2, the base sections 16 are joined at one end by a connector means such as a hinge 17. The hinge is advantageously integral with the base sections 16. The base sections 16 pivot on the upright axis of the hinge from an open position as shown in FIG. 2 to a closed position as shown in FIGS. 3, 5 and 6. The hinge 17 allows the base sections 16 to rotate about an axis which is approximately parallel with the longitudinal axis of the battery terminal post 60.

In the preferred form, the side wall 15 includes side wall sections 22 and 24 that are attached to and extend upwardly from the base sections 16. The side wall sections 22 and 24 are joined at one end by hinge 17. In a preferred embodiment the side wall sections 22 and 24 are integral with the base sections 16 and pivot with them as the base sections 16 are moved between their open and closed positions.

In the preferred embodiment, base sections 16, hinge 17, and side wall sections 22 and 24, are all molded from the same material, preferably of a flexible corrosion resistant plastic. These parts, being molded as one piece, prevent any invasion of gas through the area of hinge 17.

Base sections 16 have opposed semicircular recesses 19, as shown in FIG. 2. The recesses 19 are adapted to form an opening to fit around terminal post 60 when the base 12 is in its closed position, as shown in FIGS. 3, 5 & 6.

The side wall sections 22 and 24 terminate at end edges 23 that are opposite to the hinge 17. The end edges 23 abut when the base 12 is in its closed position, as is shown in FIG. 3. The end edges 23 are adjacent recesses 25 which together with a complimentary recess 26 in the cap 30 define an opening through which the battery cable 64 passes, as shown in FIG. 4.

The present invention also includes the cap 30, as exemplified by FIGS. 4–6. The cap 30 has a top 32. In the preferred embodiment, a side wall 34 extends around the top 32 adjacent its peripheral edge 33. Wall 34 interfits with the base side wall section 22, 24 to form the cover wall 15 in the assembled cover.

In the preferred embodiment, the cap top 32 and side wall 34 are formed from one piece of material, such as the same plastic used to form the base plate 12. The cap wall 34 is sized to slidably fit over and seal with the outward surfaces of the base wall sections 22, 24 when in the closed condition. The cap wall will thus hold the wall sections 22, 24 in their closed condition.

The present invention also includes first and second seals 38, 39 (FIGS. 2, 6). The material forming the seals 38, 39 in the preferred embodiment is a gas and acid impervious moldable putty material. It has been found that a putty-like caulk sold under the trademark "PERMAGUM" by Inmont Corp. at 1218 Central Ind. Drive, St. Louis, Mo. 63110, includes desirable properties for the seals 38, 39.

The first seal 38 is shaped as a flat washer, formed of the seal material and including a central hole 40 (FIG. 2) for receiving a terminal post 60. A slot 41 advantageously extends from hole 40 to the perimeter to allow the seal to be fitted around the terminal 60 under the connector 62. The second seal 39 is preferably formed of the same material as the first seal 38. Second seal 39 is provided in a relatively thin sheet, shaped to be formed around the battery cable 64 and pressed into the cable opening formed by recesses 25, 26 (FIGS. 4, 6).

To install cover 10, the first seal 38 is first positioned about the terminal post 60, under the connector 62 and against the battery case 66 of battery 68. The base 12 is then closed on the terminal 60 above the seal 38 with the post extending through the terminal opening and with the base sections pressed downwardly against the seal 38. This can be accomplished with the cable connector 62 in place over the terminal post 60, by first moving the base sections 16 to their open position. The opened base sections 16 are positioned about terminal post 60 below the connector 62. The base sections 16 are then moved to their closed positions, closing the semicircular openings 19 about the terminal post 60 just below the connector 62 as shown in FIG. 3.

The base 12 is next pressed firmly against the battery, causing the material to deform and seal the joint along the two base sections 16 and the area between the recesses 19 and the terminal 60.

The cap 30 can next be fitted over the base 12. As can be seen from FIGS. 5 & 6, the side wall 34 of cap 30 is shaped so that it fits over and forms a seal around side wall 22 and 24 of the base 12.

Battery cable 64 now passes through the opening in cover 10 formed by joined recesses 25, 26. The second seal 39 is placed as a washer or gasket, filling the space between the cable 64 and the adjacent surfaces of the base and cap. Thus a hermetic seal is formed about the terminal post and connector so air and gasses cannot reach the terminal post 60 or connector 62. Corrosion is thus avoided.

While the description has been directed to an embodiment of the invention for use with a battery having conventional top terminal posts, the described structure can also be used with batteries having side terminals. In either case, the cover can be quickly and easily mounted without requiring disassembly of the connectors from the terminal posts. The cover will remain sealed until it is desired to access the terminals, at which time the cap may simply be removed. Also, if desired, the base sections can be separated to fully expose the connectors.

In compliance with the statue, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A cover for a battery terminal and connector with a cable extending therefrom, the cover comprising:
   a pair of base sections each including a terminal receiving recess therein;
   connector means joining the base sections for movement between open positions wherein the base sections are separated and closed positions wherein the base sections are positioned adjacent one another to form a base plate with the terminal receiving recesses forming a terminal receiving opening;
   a cap receivable over the base plate, adapted to cover the battery terminal cover;
   a side wall extending between the cap and base plate, forming an enclosure with the base and cap, the enclosure being adapted to receive a battery terminal and connector;
   the side wall including a cable receiving receiving opening adapted to receive a battery cable;
   a first flexible seal for substantially sealing the terminal receiving opening about the terminal; and
   a second flexible seal for sealing the battery cable opening about the battery cable.

2. The cover of claim 1 wherein the connector means is comprised of a hinge joining the base sections for pivotal movement between the open and closed positions.

3. The cover of claim 2 wherein the wall is integral with the base sections and wherein the hinge joins the sections at the wall.

4. The cover of claim 3 wherein the base sections and wall are integral and formed of plastic and wherein the hinge is integral with the wall.

5. The cover of claim 1 wherein the first flexible seal is formed in the shape of a flat washer with a central hole for receiving the battery terminal, and is positionable between the base sections and battery to deform against the base sections and terminal filling and sealing the terminal opening upon compressive forces being applied against the first seal by the base sections.

6. The cover of claim 5 wherein the first seal is comprised of a moldable acid resistant adhesive putty material.

7. The cover of claim 1 wherein the first and second seals are formed of a moldable acid resistant adhesive putty.

8. The cover of claim 7 wherein the first flexible seal is formed in the shape of a flat washer with a central hole for receiving the battery terminal, and positionable between the base sections and battery to deform against the base sections and terminal filling and sealing the terminal opening upon compressive forces being applied against the first seal by the base sections.

9. The cover of claim 8 wherein the connector means is comprised of a hinge joining the base sections for pivotal movement between the open and closed positions.

10. The cover of claim 9 wherein the wall is integral with the base sections and wherein the hinge joins the sections at the wall.

11. The cover of claim 10 wherein the base sections and wall are integral and wherein the hinger is integral with the wall.

12. The cover of claim 11 wherein the wall is comprised of:
   a cap wall section on the cap;
   a base wall section integral with the base, the hinge being integral with the base wall section; and
   wherein the cap wall section and base wall section slidably interfit, forming a substantially airtight seal.

13. The cover of claim 12 wherein the cap wall section fits over the base wall to the outside thereof.

14. The cover of claim 13 wherein the cable receiving opening is defined by opposed recesses formed in the cap wall and base wall sections.

15. The cover of claim 12 wherein the cable receiving opening is defined by opposed recesses formed in the cap wall and base wall sections.

16. The cover of claim 1 wherein the wall is comprised of:
a cap wall section on the cap;
a base wall section integral with the base, the hinge being integral with the base wall section; and
wherein the cap wall section and base wall section slidably interfit, forming a substantially airtight seal.

17. The cover of claim 16 wherein the cap wall section fits over the base wall to the outside thereof.

* * * * *